(12) United States Patent
McBrearty et al.

(10) Patent No.: US 8,589,698 B2
(45) Date of Patent: Nov. 19, 2013

(54) INTEGRITY SERVICE USING REGENERATED TRUST INTEGRITY GATHER PROGRAM

(75) Inventors: Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/466,803

(22) Filed: May 15, 2009

(65) Prior Publication Data

US 2010/0293373 A1 Nov. 18, 2010

(51) Int. Cl.
*G06F 11/30* (2006.01)

(52) U.S. Cl.
USPC .......... 713/189; 726/27; 726/26; 726/3; 726/5; 726/22; 380/44; 380/277; 380/281; 380/30; 717/136; 717/140; 717/130; 717/146; 717/128; 713/175; 713/176; 713/167; 713/187; 713/171; 713/190; 713/179; 714/E12.209; 714/E11.212; 714/E11.192; 710/10; 710/5; 710/67; 710/104; 725/31

(58) Field of Classification Search
USPC ........................................................ 713/189
See application file for complete search history.

(56) References Cited

U.S. PATENT DOCUMENTS

| | | | |
|---|---|---|---|
| 6,367,012 B1 * | 4/2002 | Atkinson et al. | 713/176 |
| 6,424,718 B1 * | 7/2002 | Holloway | 380/277 |
| 6,678,828 B1 | 1/2004 | Pham et al. | |
| 6,775,827 B1 * | 8/2004 | Harkins | 717/130 |
| 6,874,084 B1 * | 3/2005 | Dobner et al. | 713/156 |
| 6,952,770 B1 * | 10/2005 | Mittal et al. | 713/168 |
| 7,111,172 B1 | 9/2006 | Duane et al. | |
| 7,260,837 B2 * | 8/2007 | Abraham et al. | 726/4 |
| 7,389,418 B2 * | 6/2008 | Bouthors | 713/168 |
| 7,392,388 B2 * | 6/2008 | Keech | 713/170 |
| 7,460,130 B2 * | 12/2008 | Salganicoff | 345/590 |
| 7,475,152 B2 * | 1/2009 | Chan et al. | 709/229 |
| 7,490,352 B2 * | 2/2009 | Kramer et al. | 726/22 |
| 7,568,098 B2 * | 7/2009 | Yeates et al. | 713/171 |
| 7,577,852 B2 * | 8/2009 | Okazaki et al. | 713/189 |
| 7,584,354 B2 * | 9/2009 | Graunke | 713/167 |

(Continued)

OTHER PUBLICATIONS

Krawczyk et al., "HMAC: Keyed-Hashing for Message Authentication", 1997.*

(Continued)

*Primary Examiner* — Krista Zele
*Assistant Examiner* — Ondrej Vostal
(74) *Attorney, Agent, or Firm* — Van Leeuwen & Van Leeuwen; John D. Flynn

(57) ABSTRACT

An approach is provided to receive a request at a first computer system from a second system. The first system generates an encryption key, modifies retrieved source code by inserting the generated encryption key into the source code, and compiles the modified source code into an executable. A hash value of the executable program is calculated and is stored along with the encryption key in a memory area. The executable and the hash value are sent to the second system over a network. The executable is executed and it generates an encrypted result using the hash value and the embedded encryption key. The encrypted result is sent back to the first system where it is authenticated using the stored encryption key and hash value.

20 Claims, 7 Drawing Sheets

(56) References Cited

U.S. PATENT DOCUMENTS

| | | | |
|---|---|---|---|
| 7,640,595 B2* | 12/2009 | Chojnacki | 726/30 |
| 7,747,988 B2* | 6/2010 | Zhu et al. | 717/131 |
| 7,752,456 B2* | 7/2010 | England et al. | 713/189 |
| 7,822,620 B2* | 10/2010 | Dixon et al. | 705/1.1 |
| 7,840,958 B1* | 11/2010 | Wan | 717/174 |
| 7,904,706 B2* | 3/2011 | Lambert et al. | 713/1 |
| 7,930,557 B2* | 4/2011 | Novosad | 713/190 |
| 7,934,197 B2* | 4/2011 | Thorell | 717/120 |
| 7,979,909 B2* | 7/2011 | Jancula et al. | 726/26 |
| 8,140,716 B2* | 3/2012 | Lu et al. | 710/10 |
| 8,145,718 B1* | 3/2012 | Kacker et al. | 709/206 |
| 8,234,697 B2* | 7/2012 | Chhabra | 726/6 |
| 2001/0034712 A1* | 10/2001 | Colvin | 705/52 |
| 2002/0016918 A1* | 2/2002 | Tucker et al. | 713/190 |
| 2002/0029342 A1* | 3/2002 | Keech | 713/184 |
| 2002/0038431 A1* | 3/2002 | Chesko et al. | 713/200 |
| 2002/0095589 A1* | 7/2002 | Keech | 713/189 |
| 2002/0178271 A1* | 11/2002 | Graham et al. | 709/229 |
| 2003/0014658 A1* | 1/2003 | Walker et al. | 713/200 |
| 2003/0028768 A1* | 2/2003 | Leon et al. | 713/169 |
| 2003/0135588 A1* | 7/2003 | Bouthors | 709/219 |
| 2004/0015690 A1* | 1/2004 | Torigai et al. | 713/156 |
| 2004/0025034 A1* | 2/2004 | Alessi et al. | 713/189 |
| 2004/0059930 A1* | 3/2004 | DiFalco et al. | 713/194 |
| 2004/0064732 A1* | 4/2004 | Hall | 713/201 |
| 2004/0117478 A1* | 6/2004 | Triulzi et al. | 709/224 |
| 2004/0148502 A1* | 7/2004 | Gollner et al. | 713/167 |
| 2005/0154899 A1* | 7/2005 | Marvel et al. | 713/187 |
| 2006/0174346 A1* | 8/2006 | Carroll et al. | 726/26 |
| 2006/0269061 A1* | 11/2006 | Balasubramanian et al. | 380/247 |
| 2006/0288222 A1* | 12/2006 | Dunkley | 713/176 |
| 2007/0250904 A1* | 10/2007 | Waller | 726/1 |
| 2008/0016000 A1* | 1/2008 | Bramhill et al. | 705/57 |
| 2008/0022003 A1* | 1/2008 | Alve | 709/229 |
| 2008/0077592 A1 | 3/2008 | Brodie et al. | |
| 2008/0115208 A1* | 5/2008 | Lee | 726/19 |
| 2009/0055658 A1* | 2/2009 | Hyser | 713/189 |
| 2009/0077383 A1* | 3/2009 | de Monseignat et al. | 713/175 |
| 2009/0144546 A1* | 6/2009 | Jancula et al. | 713/168 |
| 2009/0172389 A1* | 7/2009 | Maor | 713/150 |
| 2009/0249337 A1* | 10/2009 | Vasilevsky et al. | 718/1 |
| 2009/0249492 A1* | 10/2009 | Boesgaard Sorensen | 726/27 |
| 2011/0019822 A1* | 1/2011 | Khan et al. | 380/255 |
| 2012/0023596 A1* | 1/2012 | Womack et al. | 726/29 |

OTHER PUBLICATIONS

Chen et al., "Oblivious Hashing: A Stealthy Software Integrity Verfication Primitive", 2003.*

Summit Raj Tuladhar, "Inter-Domain Authentication for Seamless Roaming in Heterogeneous Wireless Networks." University of Pittsburg, 2007.

* cited by examiner

INTEGRITY SERVICE USING REGENERATED TRUST INTEGRITY GATHER PROGRAM

TECHNICAL FIELD

The present invention relates to gathering trust data from a client computer system. More particularly, the present invention relates to gathering client trust data using a unique instance of a trust integrity gather program that includes an encryption key.

BACKGROUND OF THE INVENTION

Emerging protocols like Trusted Network Connect (TNC), authenticate a client's integrity before letting it on a network. In other words, before the wireless or wirefull router allows a client network access, the TNC client integrity check is executed on the client to ensure the system is virus free and meets various security policies (e.g., patch levels, etc.) that have been instituted.

SUMMARY

An approach is provided to use a computer network to receive a request at a first computer system from a second computer system. The first computer system, such as a server, generates an encryption key, retrieves a program source code from a data store (e.g., hard drive), and modifies the retrieved program source code by inserting the generated encryption key into the program source code. The modified program source code is compiled into an executable program after insertion of the generated encryption key. A hash value of the executable program is calculated. The first computer system (e.g., the server), stores the encryption key and the hash value in a memory area. The executable and the hash value are then sent to the second computer system (e.g., the client) over the computer network. After the client computer system runs the executable, it returns an encrypted result which is received by the server computer system. The encrypted result has been encrypted using both the hash value and the encryption key (e.g., a public key from a public/private key pair) that was included in the executable program. When the first computer system (e.g., the server) receives the encrypted result, it retrieves the hash value and the encryption key (e.g., a private encryption key corresponding to the public encryption key) that was stored at the time that the executable program was created. The retrieved hash value and encryption key are used to authenticate the encrypted result by decrypting the encrypted result. In one embodiment, the encrypted result is first decrypted using the encryption key that was retrieved from the memory area, the first decryption resulting in an intermediate result. The intermediate result is then decrypted using the hash value resulting in unencrypted client data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
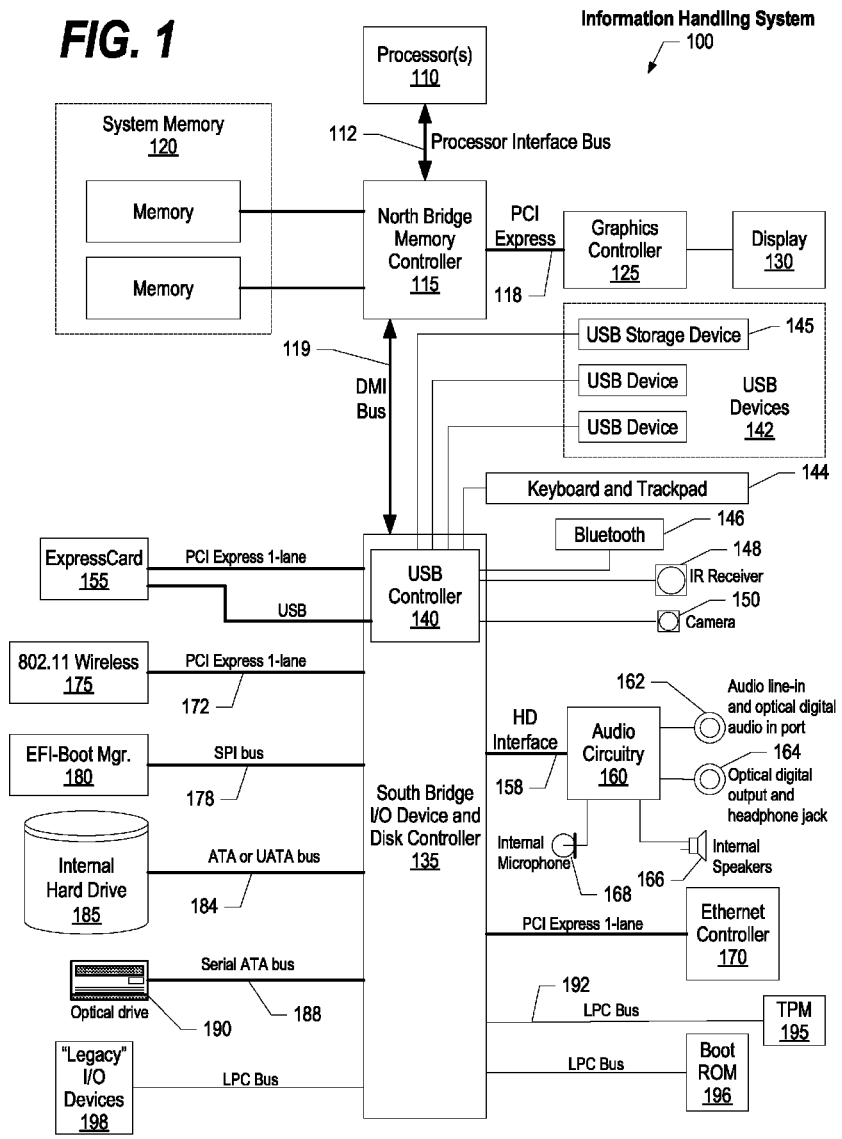
FIG. 1 is a block diagram of a data processing system in which the methods described herein can be implemented.
Figure 2:
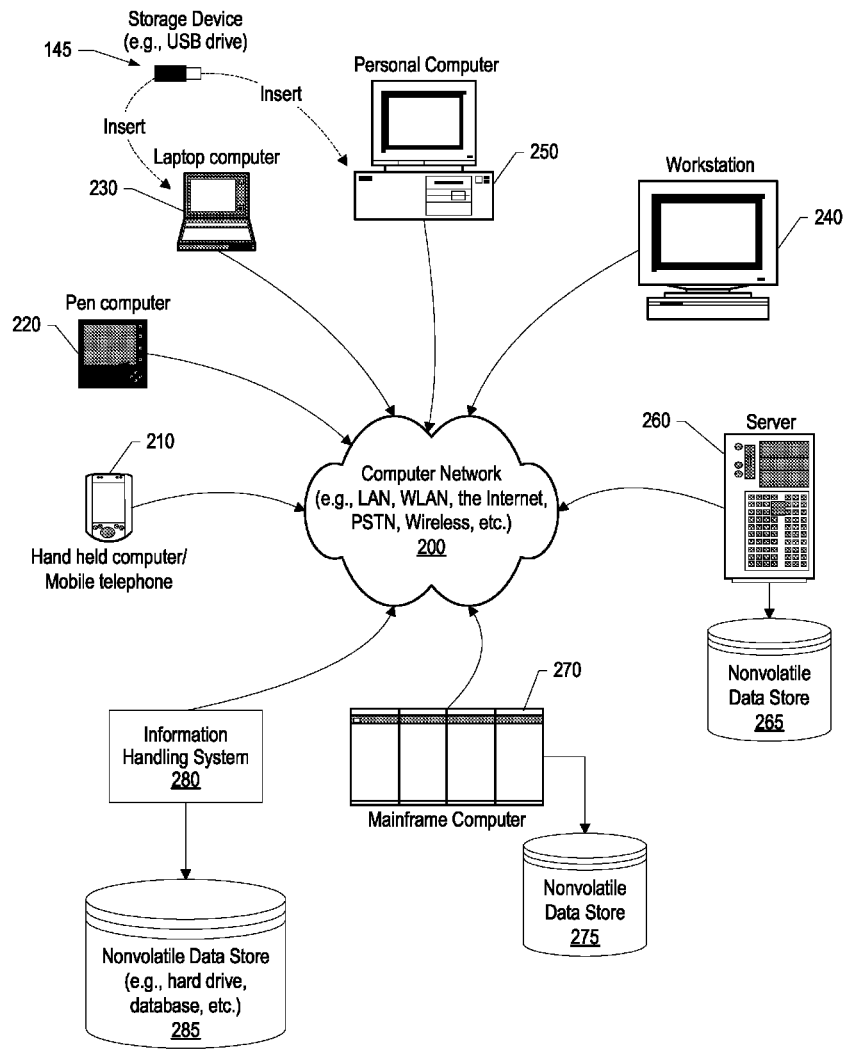
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
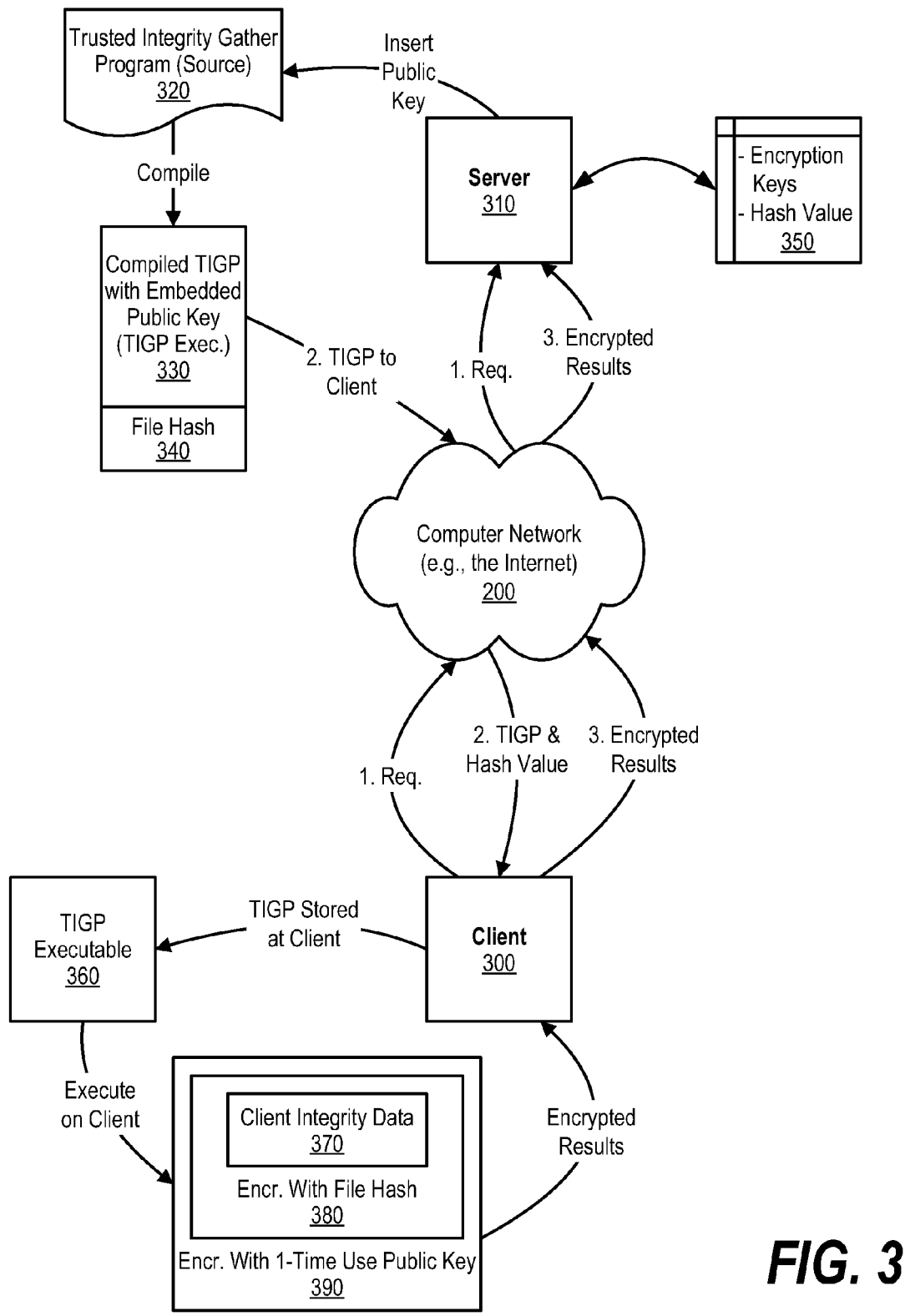
FIG. 3 is a diagram depicting a trusted integrity gather program (TIGP) being uniquely generated by a server, delivered to and executed by a client, and resulting client data being encrypted and returned to the server for analysis.

FIG. 3 is a diagram depicting a trusted integrity gather program (TIGP) being uniquely generated by a server, delivered to and executed by a client, and resulting client data being encrypted and returned to the server for analysis. Client computer system 300 sends a request to server computer system 310 via computer network 200, such as the Internet. Server computer system 310 builds a one-time-use encryption key. In one embodiment, the encryption key includes a public key and its corresponding private key. Server computer system 310 modifies program source code by inserting the generated encryption key into the source code. In the embodiment utilizing a public/private key pair, the public key is inserted in the program source code and the private key is retained by the server. In one embodiment, the program source code is a trusted integrity gather program that is executed by the client to gather information regarding the client computer system so that the server computer system can ascertain whether the client computer system is running a trusted platform. The server computer system then compiles modified program source code 320 resulting in compiled executable program 330. A hash value is computed for the compiled executable program 330 using a hashing algorithm. Because a different encryption key used to modify the program source code, the hash value will be different each time the server computer system creates a compiled executable program. The server retains the encryption keys and the computed hash value in memory area 350 along with a client identifier. The server computer system then sends executable program 330 along with computed hash value 340 back to client computer system 300 for processing.

Client computer system 300 receives executable program 360 and executes the program on the client computer system. Note that executable program 330 and executable program 360 are the same except that program 330 is located on the server computer system while program 360 is located on the client computer system. When executed, the executable program gathers client integrity data 370. The client integrity data is encrypted with the hash value that corresponds to the executable program (resulting in encrypted file 380) and this file is encrypted using the one-time-use encryption key that was inserted in the executable program (resulting in encrypted file 390). The client computer system then sends resulting encrypted file 390 back to server computer system 310 via the computer network.

The server computer system retrieves the hash value and encryption key that corresponds to this instance of the compiled executable from memory area 350. The server computer system then authenticates the client integrity data by first decrypting the received encrypted file using the encryption key corresponding to this instance of the compiled executable. The resulting intermediate file is then decrypted using the hash value. If the decryption steps are successful, the server computer system reads the client integrity data and analyzes the data to ensure that the client is running on an acceptable platform (e.g., no viruses, security patches installed, etc.). If the decryption steps are successful and the server computer system concludes that the client computer system is running on an acceptable platform, then the client request is granted and the server provides the client with access to a restricted resource (e.g., confidential data, etc.). On the other hand, if the server computer system determines that the client computer system is not running on an acceptable platform, then the client's request is denied. Returning to the authentication steps, if either of the decryption steps fail it is likely that a malevolent user or process is attempting to circumvent the authentication process and the client request is denied.

Figure 4:
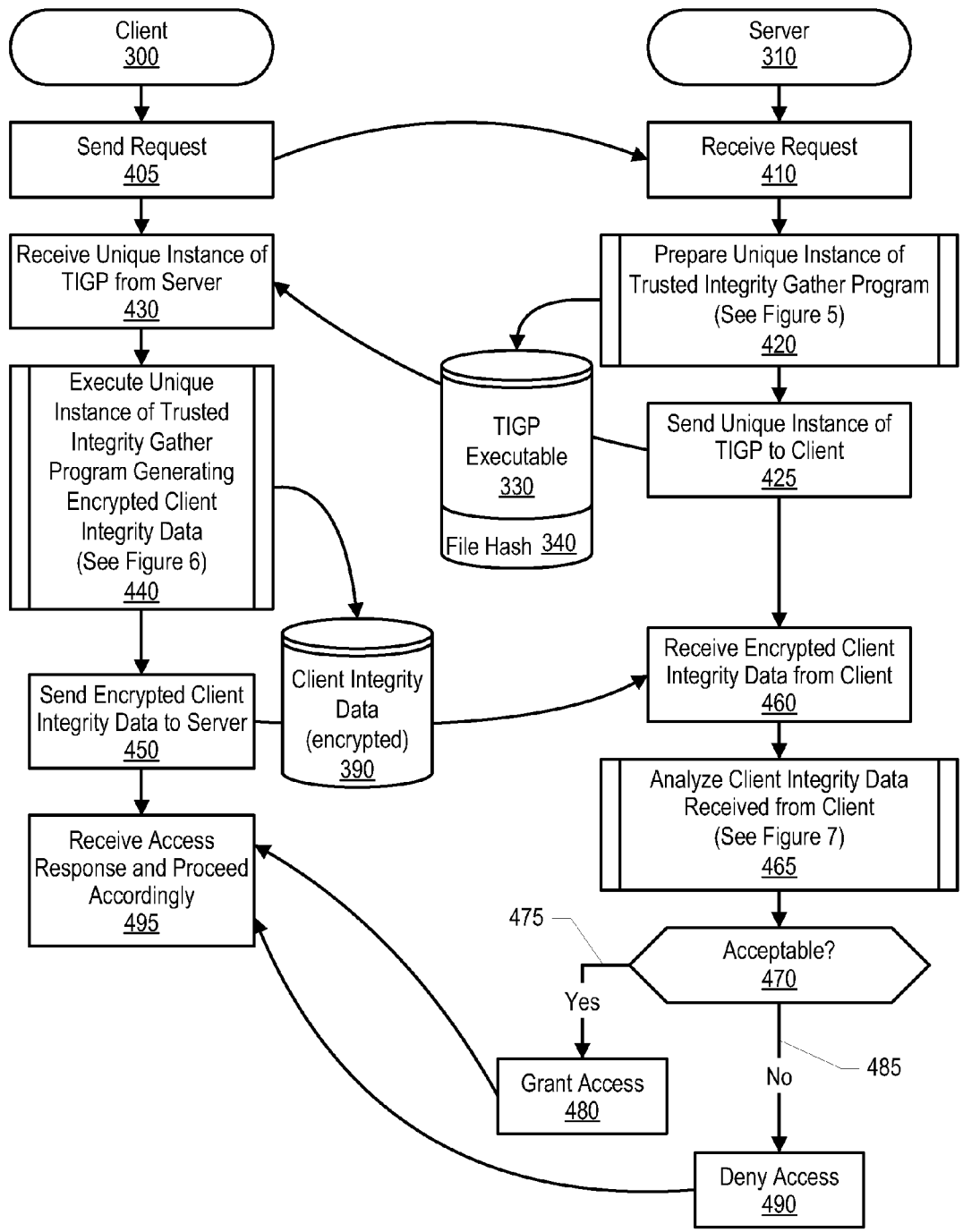
FIG. 4 is a flowchart showing the high level steps performed by the client and server shown in FIG. 3.
Figure 5:
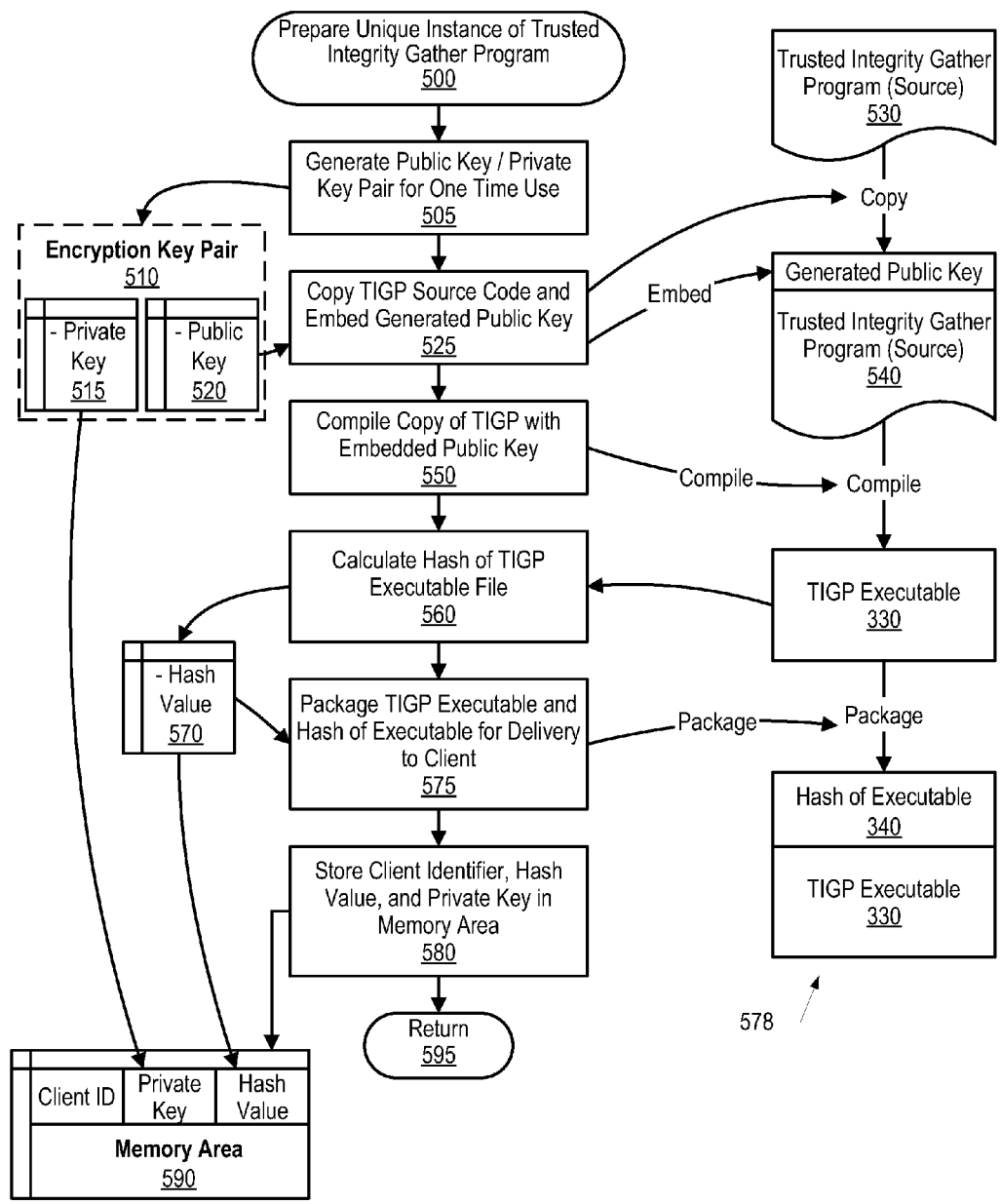
FIG. 5 is a flowchart showing steps taken by the server to prepare a unique instance of the trusted integrity gather program (TIGP)

FIG. 4 is a flowchart showing the high level steps performed by the client and server shown in FIG. 3. Server 310 (the first computer system) receives a request at step 410 from client 300 (the second computer system) after the client sends the request at step 405. Predefined process 420 is performed in order to prepare a unique instance of a Trusted Integrity Gather Program (TIGP). See FIG. 5 and corresponding text for processing details regarding predefined process 420. The result of predefined process 420 is unique instance of TIGP (330) as well as file hash 340. Because the TIGP is a unique instance, the resulting file hash 340 will be different from other unique instances of the TIGP executable. The differences, as described in further detail in FIG. 5, are due to a unique encryption key being generated and inserted in the source code of the TIGP before the unique instance of the TIGP is compiled. At step 425, the first computer system (the server) sends the unique instance of the TIGP executable back to the second computer system (the client).

At step 430, the second computer system (the client) receives the unique instance of the TIGP executable. Predefined process 440 then operates to execute the unique instance of the TIGP executable to gather trust data (e.g., virus protection information, operating system patch levels, etc.), and store the gathered trust data in a file (client integrity data 390) that is encrypted with both the hash value of the unique instance of the TIGP executable as well as with the encryption key (e.g., a public encryption key) that was inserted in the TIGP executable by the server before the executable was compiled and sent to the client. See FIG. 6 and corresponding text for processing details regarding predefined process 440. At step 450, the encrypted client integrity data file is sent from the second computer system (the client) to the first computer system (the server) for analysis.

At step 460, the first computer system (the server) receives the encrypted client integrity data from the second computer system (the client). Predefined process 465 operates to analyze the client integrity data by decrypting the data using the stored hash value and encryption key (e.g., the private key that corresponds to the public key that was inserted in the unique instance of the TIGP source code before it was compiled). In addition, if decrypted successfully (indicating that neither the TIGP program or the client integrity data was compromised), the underlying client integrity data is analyzed by predefined process 465 to determine if the client is running on a trusted platform (e.g., no viruses, operating system patch levels installed, etc.). See FIG. 7 and corresponding text for processing details regarding predefined process 465. A determination is made by the first computer system (the server) as to whether the request made by the second computer system (the client) is acceptable (decision 470). If the request is acceptable (based on the processing performed by predefined process 465), then decision 470 branches to "yes" branch 475 whereupon, at step 480, access is granted by the first computer system (the server) to the resource being requested (e.g., system access, etc.) by the second computer system (the client). On the other hand, if the request is not acceptable, either because the encrypted client integrity data file could not be decrypted (indicating tampering of some sort) or because the underlying client integrity data (viruses, operating system patch levels, etc.) were analyzed by the server and deemed unacceptable, then decision 470 branches to "no" branch 485 whereupon, at step 490 whereupon, at step 490 access to the resource controlled is denied.

Returning to client processing, the second computer system (the client) receives the access response from the first computer system (the server) at step 495 and proceeds accordingly. If the request was granted, the client is able to access and use the controlled resource. On the other hand, if the request was denied, then the client may be provided additional details in the denial response that indicates what integrity data needs improving (e.g., virus protection, install operating system patches, etc.) so that the client's integrity is at a level acceptable to the server in order to access the controlled resource.

FIG. 5 is a flowchart showing steps taken by the server to prepare a unique instance of the trusted integrity gather program (TIGP). This processing is performed by the first computer system (the server) after receiving a request from a second computer system (the client) for access to a controlled resource. Processing performed by the first computer system commences at 500 whereupon, at step 505, the first computer system generates an encryption key for one-time use in the Trusted Integrity Gather Program (TIGP) source code. In one embodiment, the encryption key is a pair of asymmetric keys known by those skilled in the art as a "public key" and a "private key." Using asymmetric keys, a file encrypted with one of the keys can only be decrypted by using the other key. Encryption key pair 510 shows the two asymmetric keys that are created—private key 515 and public key 520.

At step 525, the first computer system copies TIGP source code 530 and embeds the public key created in step 505 in the source code (e.g., as a value assigned to a static variable in the source code). The modified TIGP source code 540 is then compiled at step 550 resulting in TIGP executable program 330 which is a unique instance of the TIGP because of the insertion of the one-time use public key in the source code that was used to create executable 330. At step 560, hash value 570 is calculated of TIGP executable 330 using a known hashing algorithm, such as one of the SHA hash functions. As known by those skilled in the art, a hash value resulting from a hash calculation, or function, is a quasi-"fingerprint" of the file. If the file is altered in even a minor way, the hash value of the modified file will be different. As used herein, a hash value encompasses any value that provides such a "fingerprint," such as a checksum, a fingerprinting algorithm, a cryptographic hash function, or any such algorithm or function. If a malevolent user attempted to change the TIGP executable, the hash value resulting from the hash function would be different signifying that the TIGP executable was altered.

At step 575, the first computer system packages the TIGP executable with hash value 570 resulting in package file 578. In one embodiment, the hash function is included in the TIGP source and is used to calculate the hash value when the TIGP program is executed on the second computer system (at the client). This embodiment allows the TIGP to use the proper hash value without having to package the hash value in a package that is delivered to the client. At step 580, an identifier associated with the second computer system (the client identifier) is stored in memory area 590 along with hash value 570 and the encryption key (e.g., the private encryption key that corresponds with the public encryption key embedded in the source code). This memory area will be accessed when the second computer system returns an encrypted file and the stored hash value and encryption key will be used to decrypt the encrypted file. Processing returns to the calling routine (see FIG. 4) at 595.

Figure 6:
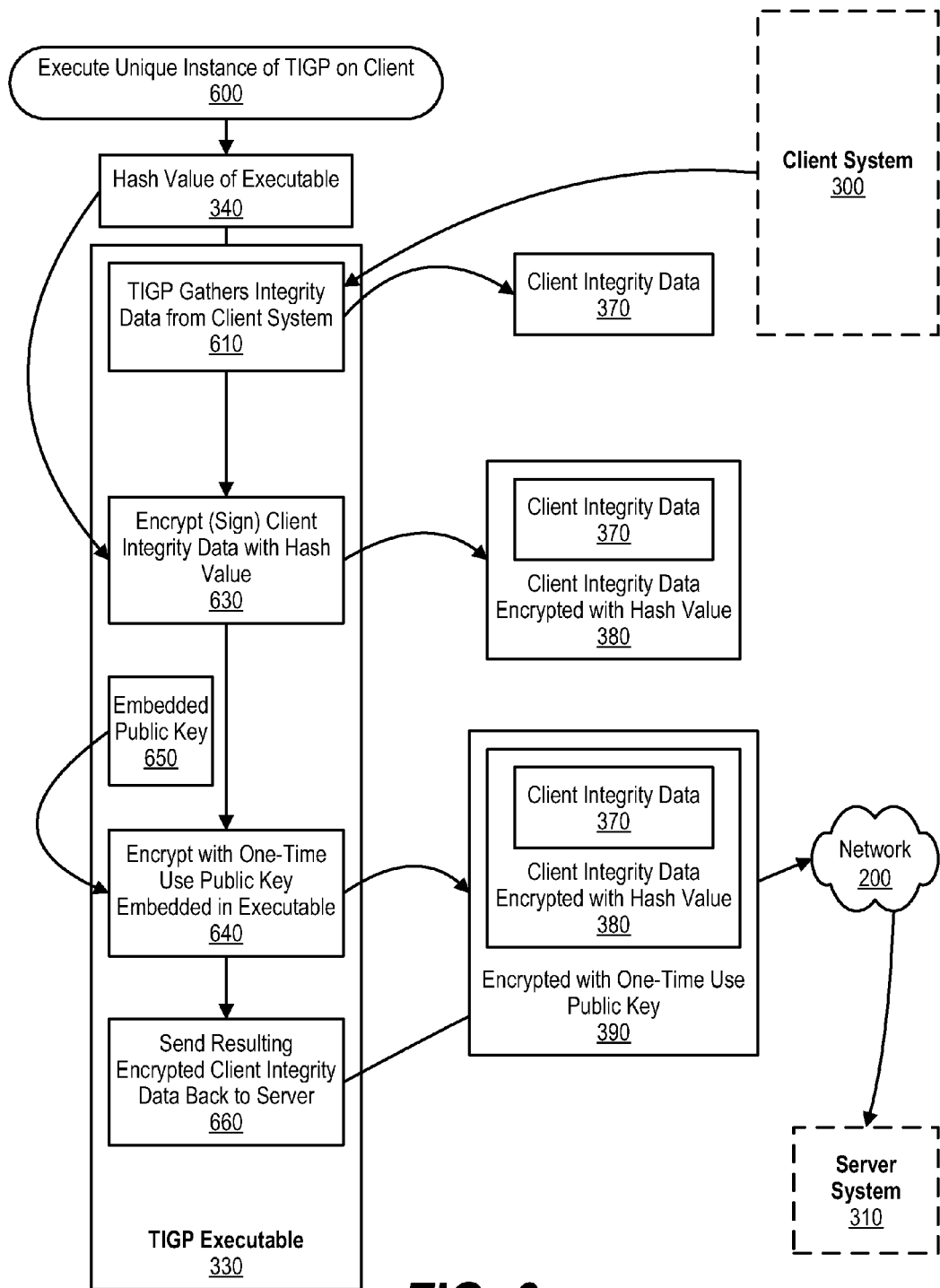
FIG. 6 is a flowchart showing steps taken by the client computer system when running the unique instance of the trusted integrity gather program (TIGP)

FIG. 6 is a flowchart showing steps taken by the client computer system when running the unique instance of the trusted integrity gather program (TIGP). This processing is performed by second computer system 300 (the client) when the client receives the TIGP executable from the first computer system (the server). Processing performed by the second computer system commences at 600. Hash value of executable 340 can be a hash value that was packaged by the first computer system and provided to the second computer system along with the TIGP executable. Alternatively, hash value of executable 340 can be program code included in the TIGP executable that calculates the hash value of the TIGP executable.

At step 610, the TIGP executable gathers integrity data from the second computer system (e.g., virus protection information, operating system security patches installed, etc.). This integrity data is stored in client integrity data store 370. At step 630, the TIGP executable encrypts (signs) client integrity data store 370 using the hash value of the TIGP executable. As described above, the hash value may be provided along with the TIGP executable in a package or, alternatively, the TIGP executable may include the instructions used to generate the hash value so that the hash value is dynamically generated by the TIGP executable. The encryption of the client integrity data using the hash value results in encrypted data store 380.

At step 640, the one-time use encryption key (e.g., the public key) that was embedded in the TIGP source code (embedded key 650) is used to encrypt data store 380. This encryption results in encrypted data store 390. Finally, at step 660, the TIGP executable sends encrypted client integrity data store 390 back to the first computer system (server 310) via computer network 200 (e.g., the Internet).

Figure 7:
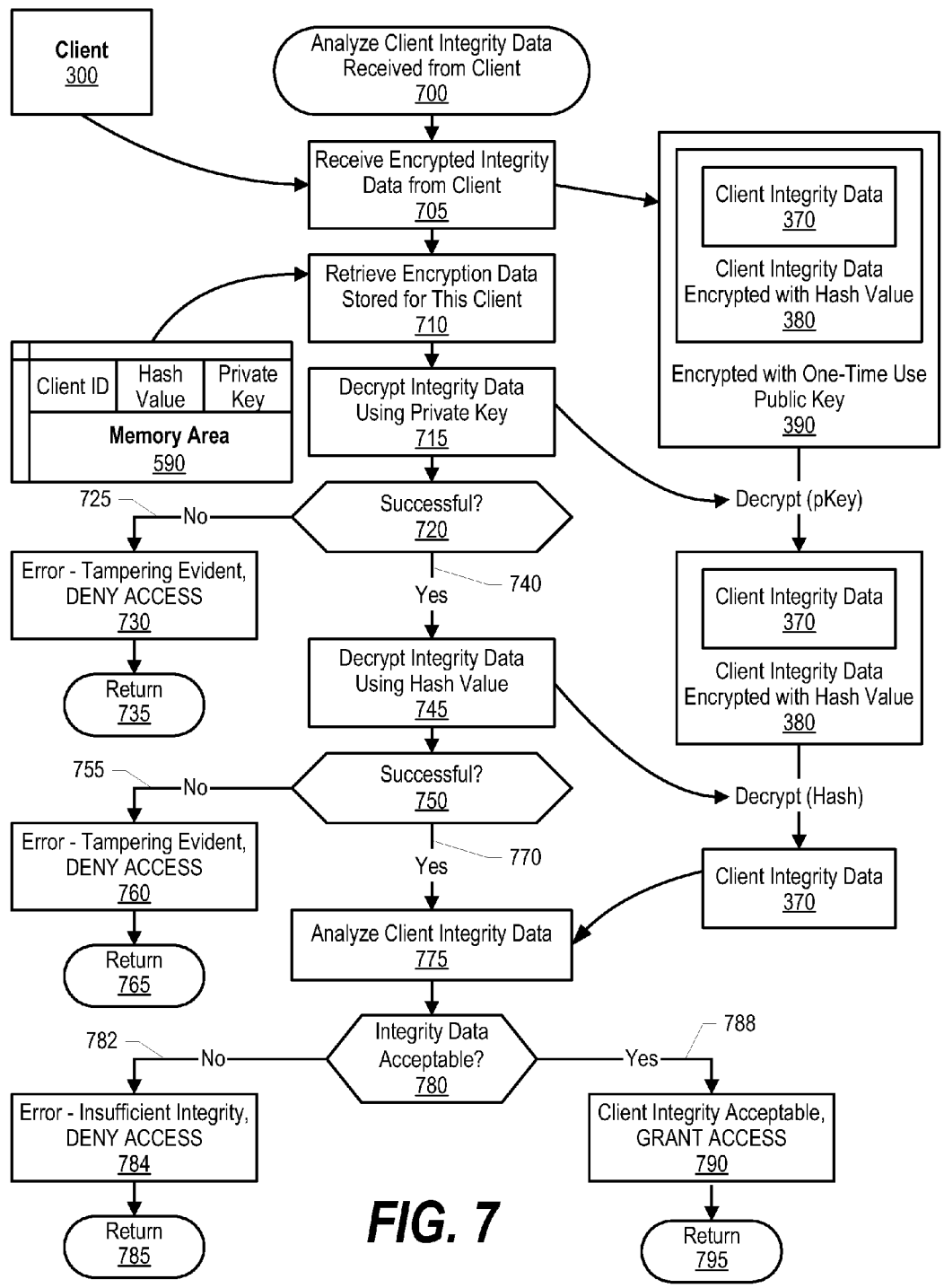
FIG. 7 is a flowchart showing steps taken by the server computer system to analyze the client integrity data received from the client computer system.

FIG. 7 is a flowchart showing steps taken by the server computer system to analyze the client integrity data received from the client computer system. Processing shown in FIG. 7 commences at 700 when, at step 705, the first computer system (the server) receives encrypted client integrity data store 390 from the second computer system (client 300). At step 710, the encryption data corresponding to the second computer system (e.g., the client identifier) is retrieved from memory area 590. The encryption data includes the hash value that corresponds to the unique instance of the TIGP executable with the one-time use encryption key (e.g., the public key) included in the executable.

At step 715, the first computer system decrypts the integrity data using the encryption key (e.g., the private key when asymmetric encryption is used). If the decryption of step 715 is successful, encrypted integrity data store 380 will result with the integrity data still being encrypted (signed) using the hash value). A determination is made as to whether the decryption using the encryption key (e.g., the private key) was successful (decision 720). If the decryption was not successful, then decision 720 branches to "no" branch 725 whereupon an error results and the second computer system (the client) is denied access. Processing then returns to the calling routine at 735.

On the other hand, if the decryption of the file using the encryption key was successful, then decision 720 branches to "yes" branch 740 whereupon, at step 745, data store 380 is decrypted using the hash value retrieved from memory area 590. If this encryption step is successful, unencrypted client integrity data 370 will result. A determination is made as to whether decryption using the hash value was successful (decision 750). If the decryption was not successful, then decision 750 branches to "no" branch 755 whereupon an error results and the second computer system (the client) is denied access. Processing then returns to the calling routine at 765.

On the other hand, if the decryption of the file using the retrieved hash value was successful, then decision 750 branches to "yes" branch 770 whereupon, at step 775, unencrypted client integrity data 370 is analyzed pursuant to policies set by the organization to determine whether the second computer system's integrity data is acceptable. A determination is made as to whether the second computer system (the client) has acceptable integrity data (decision 780). If the client does not have acceptable integrity data, then decision 780 branches to "no" branch 782 whereupon, at step 784, an error is returned to the second computer system indicating that access is denied due to insufficient integrity data. Processing then returns to the calling routine at 785. On the other hand, if the client's integrity data is acceptable, then decision 780 branches to "yes" branch 788 whereupon, at step 790, the second computer system (the client) is granted access to the resource that is being controlled by the first computer system. Processing then returns to the calling routine at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
receiving, at a first computer system, a request from a second computer system, wherein the request was transmitted over a computer network;
in response to receiving the request, modifying program source code, by the first computer system, by inserting an encryption key into the program source code;
compiling the modified program source code subsequent to the insertion of the encryption key, the compiling resulting in an executable program that includes the encryption key;
generating, at the first computer system, a hash value of the executable program that includes the encryption key;
concurrently sending the hash value and the executable program, which includes the encryption key, to the second computer system over the computer network, wherein the executable program is adapted to gather client integrity data at the second computer system;
receiving an encrypted result at the first computer system from the second computer system, wherein the encrypted result includes the client integrity data and was encrypted by the executable program running on the second computer system using the encryption key and the hash value;
decrypting, by the first computer system, the encrypted result using the encryption key and the hash value, the decrypting resulting in unencrypted client integrity data; and
authenticating, by the first computer system, the unencrypted client integrity data.

2. The method of claim 1 wherein the generation of the encryption key comprises generating a public key and a private key, and wherein the modifying is performed by inserting the public key into the program source code and wherein the private key is stored in a memory area, retrieved, and used to decrypt the encrypted result.

3. The method of claim 2 wherein the public key and the private key are single-use keys and wherein the executable program is a unique compiled instance of the program source code.

4. The method of claim 1 wherein the program source code is a trusted integrity gather program.

5. The method of claim 1 wherein the decrypting further comprises:
first decrypting the encrypted result using the encryption key that is retrieved from a memory area, the first decrypting resulting in an intermediate result; and
second decrypting the intermediate result using the hash value that is retrieved from the memory area, the second decrypting resulting in the unencrypted client integrity data.

6. The method of claim 5 further comprising:
comparing the unencrypted client integrity data to one or more acceptability thresholds;
granting the second computer system access to a restricted resource controlled by the first computer system in response to the unencrypted client integrity data meeting the acceptability thresholds; and
denying the second computer system access to the restricted resource in response to the unencrypted client integrity data failing to meet the acceptability thresholds.

7. The method of claim 1 further comprising:
packaging the executable and the hash value in a package that is delivered to the second computer system over the computer network.

8. An information handling system comprising:
one or more processors;
a memory coupled to at least one of the processors;
a nonvolatile storage area coupled to at least one of the processors;
a network adapter that connects the information handling system to a computer network; and
a set of instructions stored in the memory and executed by at least one of the processors in order to perform actions of:
receiving, at the network adapter, a request from a second information handling system, wherein the request was transmitted over the computer network;
in response to receiving the request, modifying program source code by inserting an encryption key into the program source code;

compiling the modified program source code subsequent to the insertion of the encryption key, the compiling resulting in an executable program that includes the encryption key;

generating a hash value of the executable program that includes the encryption key;

concurrently sending the hash value and the executable program, which includes the encryption key, to the second information handling system over the computer network, wherein the executable program is adapted to gather client integrity data at the second information handling system;

receiving an encrypted result from the second information handling system, wherein the encrypted result includes the client integrity data and was encrypted by the executable program running on the second information handling system using the encryption key and the hash value;

decrypting the encrypted result using the encryption key and the hash value, the decrypting resulting in unencrypted client integrity data; and authenticating the unencrypted client integrity data.

9. The information handling system of claim 8 wherein the generation of the encryption key comprises generating a public key and a private key and wherein the modifying is performed by inserting the public key into the program source code and wherein the private key is stored in the memory area, retrieved, and used to decrypt the encrypted result.

10. The information handling system of claim 9 wherein the public key and the private key are single-use keys and wherein the executable program is a unique compiled instance of the program source code.

11. The information handling system of claim 8 wherein the program source code is a trusted integrity gather program.

12. The information handling system of claim 8 wherein the decrypting step further comprises additional actions of:

first decrypting the encrypted result using the encryption key that is retrieved from a memory area, the first decrypting resulting in an intermediate result; and second decrypting the intermediate result using the hash value that is retrieved from the memory area, the second decrypting resulting in the unencrypted client integrity data.

13. The information handling system of claim 12 further comprising additional actions of:

comparing the unencrypted client integrity data to one or more acceptability thresholds;

granting the second information handling system access to a restricted resource controlled by the information handling system in response to the unencrypted client integrity data meeting the acceptability thresholds; and denying the second information handling system access to the restricted resource in response to the unencrypted client integrity data failing to meet the acceptability thresholds.

14. A computer program product stored in a computer readable storage device, comprising functional descriptive material that, when executed by an information handling system, causes the information handling system to perform actions that include:

receiving, at a first computer system, a request from a second computer system, wherein the request was transmitted over a computer network;

in response to receiving the request, modifying program source code, by the first computer system, by inserting an encryption key into the program source code;

compiling the modified program source code subsequent to the insertion of the encryption key, the compiling resulting in an executable program that includes the encryption key;

generating, at the first computer system, a hash value of the executable program that includes the encryption key;

concurrently sending the hash value and the executable program, which includes the encryption key, to the second computer system over the computer network, wherein the executable program is adapted to gather client integrity data at the second computer system;

receiving an encrypted result at the first computer system from the second computer system, wherein the encrypted result includes the client integrity data and was encrypted by the executable program running on the second computer system using the encryption key and the hash value;

decrypting, by the first computer system, the encrypted result using the encryption key and the hash value, the decrypting resulting in unencrypted client integrity data; and authenticating, by the first computer system, the unencrypted client integrity data.

15. The computer program product of claim 14 wherein the generation of the encryption key comprises generating a public key and a private key and wherein the modifying is performed by inserting the public key into the program source code and wherein the private key is stored in the memory area, retrieved, and used to decrypt the encrypted result.

16. The computer program product of claim 15 wherein the public key and the private key are single-use keys and wherein the executable program is a unique compiled instance of the program source code.

17. The computer program product of claim 14 wherein the program source code is a trusted integrity gather program.

18. The computer program product of claim 14 wherein the decrypting further comprises actions of:

first decrypting the encrypted result using the encryption key that is retrieved from a memory area, the first decrypting resulting in an intermediate result; and second decrypting the intermediate result using the hash value that is retrieved from the memory area, the second decrypting resulting in the unencrypted client integrity data.

19. The computer program product of claim 18 further comprising additional actions of:

comparing the unencrypted client integrity data to one or more acceptability thresholds;

granting the second computer system access to a restricted resource controlled by the first computer system in response to the unencrypted client integrity data meeting the acceptability thresholds; and denying the second computer system access to the restricted resource in response to the unencrypted client integrity data failing to meet the acceptability thresholds.

20. The computer program product of claim 14 further comprising additional actions of:

packaging the executable and the hash value in a package that is delivered to the second computer system over the computer network.

* * * * *